United States Patent [19]
Villeneuve

[11] Patent Number: 5,758,390
[45] Date of Patent: Jun. 2, 1998

[54] REVERSIBLE CABLE TIE

[76] Inventor: Gérald Villeneuve, 23 St-Louis, Gatineau, Canada, J8T 2R7

[21] Appl. No.: 786,566

[22] Filed: Jan. 21, 1997

[30]  Foreign Application Priority Data

Feb. 1, 1996 [CA] Canada ................... 2168588

[51] Int. Cl.$^6$ ........................................... B65D 63/00
[52] U.S. Cl. ........................................... 24/16 PB; 24/30.5 P
[58] Field of Search .................... 24/16 R, 16 PA, 24/30.5 R, 30.5 P, 17 AP, 17 A; 248/74.3; 292/318, 322

[56]  References Cited

U.S. PATENT DOCUMENTS 3,597,803   8/1971   Van Neil .................. 24/16 PB
4,240,183  12/1980   Sumimoto et al. ........ 24/16 PB

*Primary Examiner*—James R. Brittain

[57]  ABSTRACT

A cable tie which can be used for bundling electrical wires or many other objects. The cable tie of this invention comprises an elongate strap of plastic material composed of a longitudinal channel on one side and transversal notches on the other. This cable tie secures the wires by inserting its tail through either side of its block head. When the tail of the cable tie is inserted into the aperture located on a first side of the block head, the said cable tie becomes locked and impossible to be open (not re-usable). However, when the tail of the cable tie is inserted into the aperture located on the opposite side of the block head, the said cable tie becomes locked but re-usable by using a lever arm mechanism to release the elongate strap from the block head and open the cable tie.

4 Claims, 4 Drawing Sheets

REVERSIBLE CABLE TIE

BACKGROUND OF THE INVENTION

The present invention relates generally to a cable tie. More particularly, the present invention relates to a cable tie used for bundling electrical wires which can be re-usable or permanently locked.

Cable ties generally comprise an elongate strap having transversal notches on one side and a smooth surface on the other, and a head having an aperture through which the tail of the elongate strap is inserted. Cable ties are known in which a metal barb is used instead of a conventional plastic barb. This particular characteristic is useful when high strength is required but is not an important feature of the preferred embodiments of this invention. In order to keep flexibility in the barb and facilitate the insertion of the tail through the aperture formed in the head, a conventional plastic barb is used in the present invention. Most recently, re-usable cable ties have been commercially available and well used. However, none are known having the two options presented in this invention which are the option of being re-usable and the option of being permanently locked. The problem with the existing re-usable cable ties is that the button mechanism used to release the elongate strap from the head is made such that a person must push the button or the lever arm in one direction while pulling the cable tie in the opposite direction so the person must absolutely use both her hands to open it.

I discovered that the above mentioned problem can be resolved using a fulcrum with a lever arm. That kind of configuration allows the force applied on the lever arm to be reversed and to be doubled so the cable tie can be opened using only one hand. Moreover, the cable tie of the present invention gives both the options of being re-usable and being permanently locked.

BRIEF SUMMARY OF THE INVENTION

It is an object of the present invention to provide a cable tie having an elongate strap formed from a synthetic resin and composed of a longitudinal smooth surface channel on one side and of transversal notches on the other.

It is a further object of the present invention to provide a cable tie having a block head composed of a lever arm, a fulcrum, a permanently locking barb on its lower part and a movable barb attached to the lever arm on its upper part. Both permanently locking and movable barb are provided with teeth.

It is a still further object of the present invention to provide a cable tie having one distinct colour on each side of the elongate strap which is used to identify the option chosen by the user. Thus, the colour red can be used to identify the permanently locked option and the colour green to identify the re-usable option. The colour being exposed on the external surface of the loop formed by the action of wrapping the cable tie around the electrical wires will then indicate the option chosen by the user.

In the efficient attainment of these and other objects, the present invention provides a cable tie being reversible in a sense that the tail of the elongate strap can be insert into the aperture on either side of the block head. Thus, when the tail is inserted into one side of the block head, the said cable tie becomes permanently locked. When the tail is inserted into the opposite side of the block head, the said cable tie becomes locked but re-usable by using a lever arm mechanism to release the elongate strap from the said block head and open the cable tie.

BRIEF DESCRIPTION OF THE SEVERAL VIEWS OF THE DRAWING

FIG. 2 is a greatly enlarged sectional view of the block-head of FIG. 1a.

DETAILED DESCRIPTION OF THE INVENTION

Figure 1A:
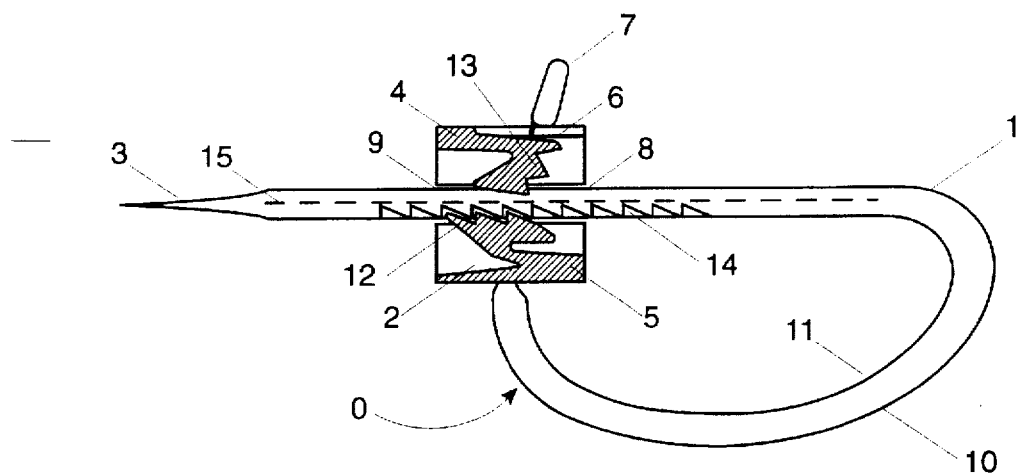
FIG 1a is a side view of the cable tie in a permanently locked configuration (not re-usable), the colour red being exposed on the external surface of the loop.
Figure 1B:
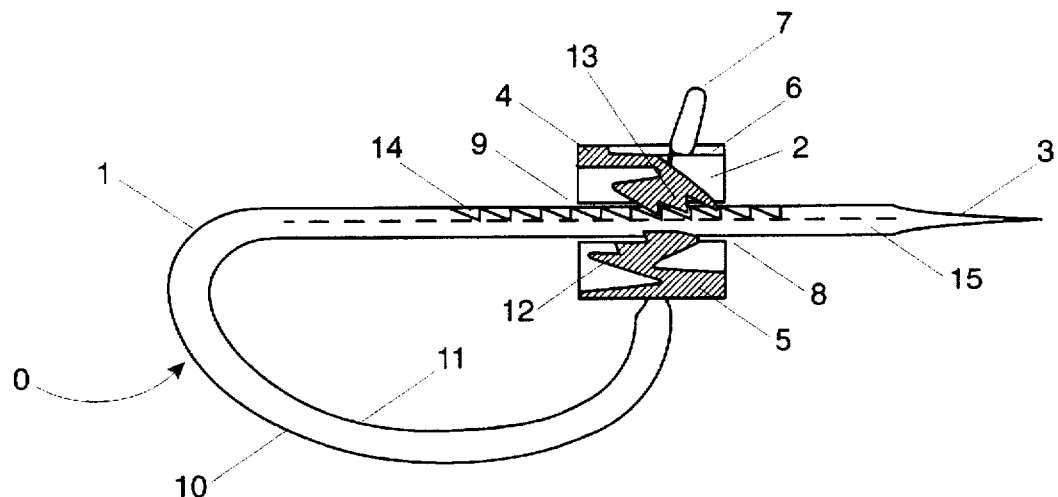
FIG. 1b is a side view of the cable tie in a re-usable configuration, the colour green being exposed on the external surface of the loop.
Figure 2:
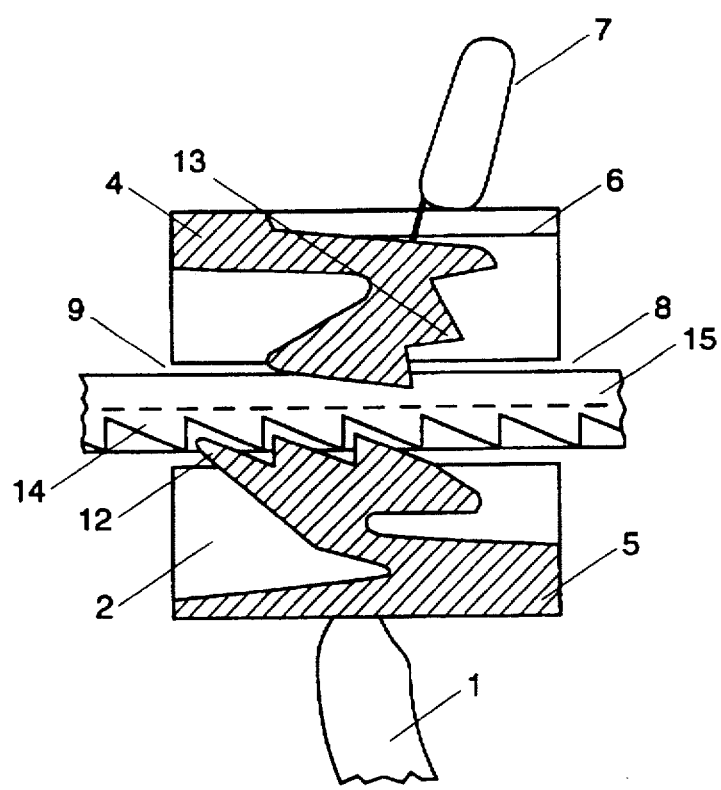

FIG. 1a and FIG. 1b show a cable tie (0) formed from a synthetic resin and having an elongate flexible strap portion (1) and a head portion (2) all molded as a single piece. The elongate strap (1) comprises a longitudinal channel (15) on one side and transversal notches (14) on the other side. The block head (2) is made in a substantially cubic shape and comprises a permanently locking barb (5) located in its lower part, a movable barb (4) located in its upper part, a first opening (8) on one side of the block head (2), a second opening (9) on the opposite side of the block head (2), a lever arm (7) attached to the movable barb (4) and a fulcrum (6). Both movable and permanently locking barbs (4, 5) comprise teeth (13, 12) respectively.

Referring to FIG. 1a, when the tail (3) of the elongate strap (1) is inserted through the first opening (8) of the block head (2), the side of the elongate strap (1) comprising the longitudinal channel (15) and identified by the colour red is exposed on the external surface of the loop (10) formed by the action of wrapping the cable tie (0) around any object. The transversal notches (14) located on the internal surface of the loop (11) are then held by the teeth (12) of the permanently locking barb (5), thus preventing the cable tie (0) to be opened. That kind of configuration indicates that the cable tie (0) is permanently locked and is then not re-usable.

Figure 3:
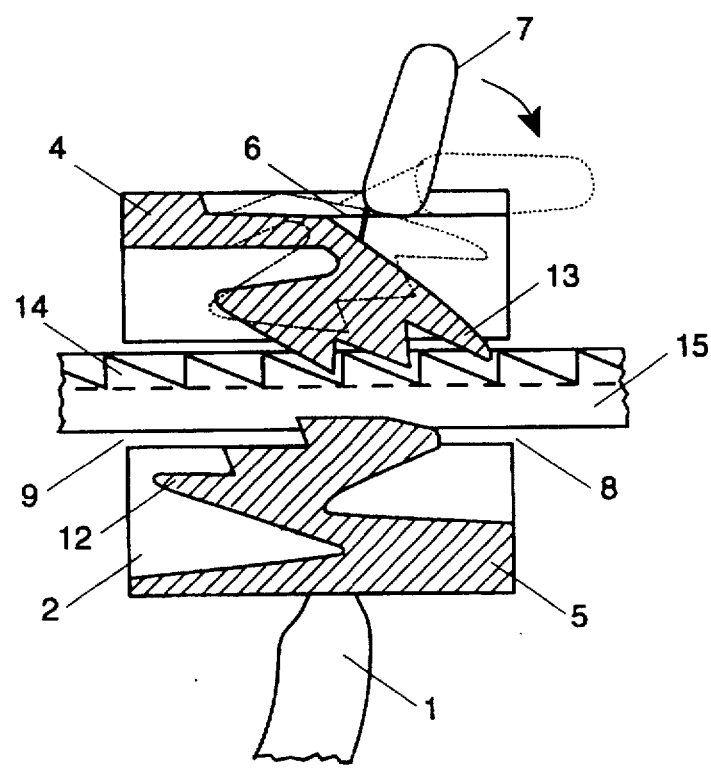
FIG. 3 is a greatly enlarged sectional view of the block head of FIG. 1b.
Figure 4:
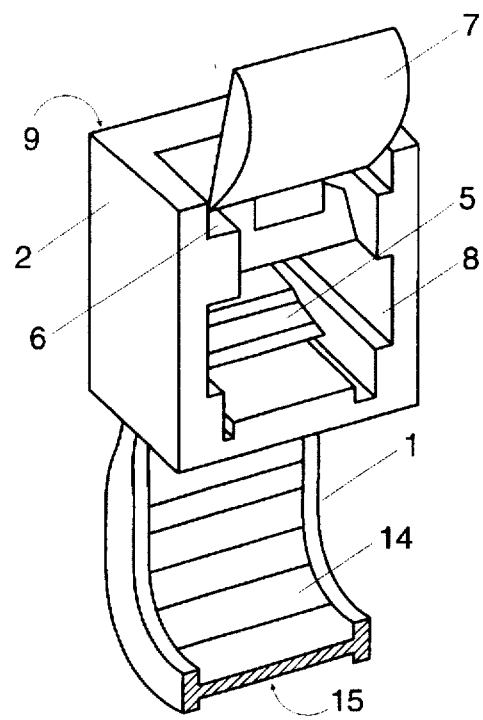
FIG. 4 is a perspective view of the block head and a part of the elongate strap showing the transversal notches.

Referring to FIG. 1b, when the tail (3) is inserted through the second opening (9) of the block head (2), the side of the elongate strap (1) comprising the transversal notches (14) and identified by the colour green is exposed on the external surface of the loop (10). In such a configuration, the teeth (13) of the movable barb (4) hold the transversal notches (14) while the teeth (12) of the permanently locking barb (5) slide freely into the longitudinal channel (15). Thus, when it is desired to open the cable tie (0), the lever arm (7) is pushed down in the direction towards the tail (3) (as shown in FIG. 3). The lever arm (7) leans against the fulcrum (6) and lifts the movable barb (4), allowing the teeth (13) to be desengaged from the transversal notches (14) and enable the cable tie (0) to be opened.

The cable tie (0) is made such that the transversal cross-section of its elongate strap (1) is of an I shape and the longitudinal channel (15) located on one side of the said elongate strap (1) allows the teeth (12, 13) to be slide therein so it offers no resistance to the cable tie (0) when opening it.

Although the preferred embodiment of the cable tie of this invention has been described, it will be understood that various changes may be made in the form, details, proportion and arrangement of parts without departing from the teachings of the invention. The matter set forth in the foregoing description and accompanying drawings is offered by way of illustration only and not as a limitation. The actual scope of the invention is intended to be defined in the following claims when viewed in their proper perspective based on the prior art.

What I claim as my invention is:

1. A fastening device made from a flexible synthetic resin and used for bundling articles comprising:

an elongate strap having a first surface on which are evenly spaced transversal notches, and a second surface composed of a longitudinal smooth channel;

a block head formed at one end of the elongate strap, said block head comprising two lateral inner walls, and upper and lower inner walls defining an aperture having a first and a second opening through which said elongate strap can be inserted, said block head comprising movable and permanently locking barbs having teeth to engage said transversal notches of the elongate strap, said movable and permanently locking barbs being disposed respectively within said upper and lower inner walls in a position to allow insertion of a tail end of the elongate strap throughout said aperture and passed the movable and permanently locking barbs in order to prevent removal of said elongate strap from the block head, such that, when the teeth of the movable barb engage the transversal notches of said elongate strap, the removal of the elongate strap from the block head is temporarily prevent and, when the teeth of the permanently locking barb engage the transversal notches of said elongate strap, the removal of the elongate strap from the block head is permanently prevent;

a lever arm coupled to the block head, said lever arm having a fixed end and a distal end and being sufficiently long to be coupled to the movable barb at its fixed end and to lean against a fulcrum located on top of the block head at its distal end;

wherein the fastening device is re-usable when the tail end of said elongate strap is inserted through the first opening passed the movable and permanently locking barbs, and the lever arm is pivoted such that it lifts the movable barb and disengaged its teeth from the transversal notches of said elongate strap making the elongate strap freely sliding through the aperture, and wherein the fastening device is permanently locked when the tail of said elongate strap is inserted through the second opening passed the movable and permanently locking barbs and the teeth of the permanently locking barb engage the transversal notches of said elongate strap thereby preventing the elongate strap from being removed from the block head.

2. A fastening device as set forth in claim 1, wherein said first surface of the elongate strap comprising the evenly spaced transversal notches is identified using a first colour to indicate that the fastening device is reusable when said first surface is shown externally.

3. A fastening device as set forth in claim 2, wherein said second surface of the elongate strap composed of a longitudinal smooth channel is identified using a second colour to indicate that the fastening device is permanently locked when said second surface is shown externally.

4. A fastening device as set forth in claim 3, wherein said block head is made in a substantially cubic shape and the elongate strap is made of an I shape in its transversal cross-section.

* * * * *